United States Patent
Dubey et al.

(10) Patent No.: US 9,300,644 B1
(45) Date of Patent: Mar. 29, 2016

(54) KNOWLEDGE-BASED AUTHENTICATION BASED ON TRACKED CREDENTIAL USAGE

(71) Applicant: Symantec Corporation, Mountain View, CA (US)

(72) Inventors: Sankalp Dubey, Agra (IN); Srinath Venkataramani, Bangalore (IN); Phalgun Garimella, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 78 days.

(21) Appl. No.: 13/773,924

(22) Filed: Feb. 22, 2013

(51) Int. Cl.
*H04L 29/06* (2006.01)

(52) U.S. Cl.
CPC ............ *H04L 63/08* (2013.01); *H04L 63/0838* (2013.01)

(58) Field of Classification Search
None
See application file for complete search history.

(56) References Cited

U.S. PATENT DOCUMENTS

| | | | | |
|---|---|---|---|---|
| 6,763,468 B2* | 7/2004 | Gupta et al. | | 726/2 |
| 7,185,364 B2* | 2/2007 | Knouse et al. | | 726/8 |
| 7,231,661 B1* | 6/2007 | Villavicencio et al. | | 726/4 |
| 7,346,775 B2* | 3/2008 | Gasparinl | | G06F 21/31 709/225 |
| 7,552,467 B2* | 6/2009 | Lindsay | | 726/5 |
| 7,568,098 B2* | 7/2009 | Yeates | | H04L 63/08 713/171 |
| 8,032,927 B2 | 10/2011 | Ross | | |
| 8,527,751 B2* | 9/2013 | Errico | | 713/165 |
| 8,533,803 B2* | 9/2013 | Cha | | G06F 21/34 726/7 |
| 8,584,221 B2* | 11/2013 | Mazur et al. | | 726/8 |
| 8,656,154 B1* | 2/2014 | Kailash et al. | | 713/155 |
| 8,689,005 B2* | 4/2014 | Lentini | | G06F 19/323 705/2 |
| 8,745,718 B1* | 6/2014 | Dufel et al. | | 726/9 |
| 8,756,661 B2* | 6/2014 | Levenberg | | H04L 63/0807 726/4 |
| 2003/0061512 A1* | 3/2003 | Flurry et al. | | 713/201 |
| 2008/0301460 A1* | 12/2008 | Miller et al. | | 713/183 |
| 2011/0246765 A1* | 10/2011 | Schibuk | | 713/158 |
| 2012/0185692 A1* | 7/2012 | Hamlin | | H04L 9/3231 713/155 |
| 2012/0221696 A1* | 8/2012 | Ferris | | 709/223 |
| 2012/0240204 A1* | 9/2012 | Bhatnagar | | G06F 21/35 726/5 |
| 2013/0227286 A1* | 8/2013 | Brisson | | H04L 63/062 713/168 |
| 2013/0275748 A1* | 10/2013 | Lu | | 713/155 |
| 2014/0068262 A1* | 3/2014 | Robertson et al. | | 713/168 |

OTHER PUBLICATIONS

Kim, Seung-Hyun; Jin, Seung-Hun; Lim, Hyung-Jin. A Concept of Interoperable Authentication Framework for dynamic relationship in Identity Management. ICACT 2010. vol. 2. Pub. Date: 2010. Relevant pp. 1635-1639. http://ieeexplore.ieee.org/stamp/stamp.jsp?tp=&arnumber=5440344.*

(Continued)

*Primary Examiner* — Jeremiah Avery
(74) *Attorney, Agent, or Firm* — Wilmer Cutler Pickering Hale and Dorr LLP

(57) ABSTRACT

A method and apparatus for knowledge-based authentication by a cloud-based authentication service are described. A cloud-based authentication service is to track credential usage of an end-user at the cloud-based authentication service. The authentication service receives a credential request for credentials associated with the end-user from a relying party website. The end-user no longer has authentication credentials for access to the relying party website. The authentication service issues a dynamic knowledge-based (KB) challenge to the end-user, the dynamic KB challenge being based on at least some of the tracked credential usage of the end-user. The processing logic receives a response to the dynamic KB challenge from the end-user and sends temporary credentials to the relying party for the end-user when the response is validated.

20 Claims, 6 Drawing Sheets

(56) References Cited

OTHER PUBLICATIONS

Grzonkowski, Slawomir; Corcoran, Peter M.; Coughlin, Thomas. Security Analysis of Authentication Protocols for Next-Generation Mobile and CE Cloud Services. ICCE-Berlin, 2011. Pub. Date: 2011. Relevant pp. 83-87. http://ieeexplore.ieee.org/stamp/stamp.jsp?tp=& arnumber=6031855.*

Grzonkowski, Slawomir; Corcoran, Peter M.; Coughlin, Thomas. Security Analysis of Authentication Protocols for Next-Generation Mobile and CE Cloud Services. 2011 IEEE International Conference on Consumer Electronics—Berlin (ICCE-Berlin). Relevant pp. 83-87. http://ieeexplore.ieee.org/stamp/stamp.jsp?tp=&arnumber=6031855.*

Xiao, Yanping; Lin, Chuang; Jiang, Yixin; Chu, Xiaowen; Liu, Fangqin. An Efficient Privacy-Preserving Publish-Subscribe Service Scheme for Cloud Computing. 2010 IEEE Global Telecommunications Conference (GLOBECOM 2010). Relevant pp. 1-5. http://ieeexplore.ieee.org/stamp/stamp.jsp?tp=&arnumber=5683310.*

Dawoud, Wesam; Takouna, Ibrahim; Meinel, Christoph. Infrastructure as a Service Security: Challenges and Solutions. 2010 The 7th International Conference on Informatics and Systems (INFOS). Relevant pp. 1-8. http://ieeexplore.ieee.org/stamp/stamp.jsp?tp=& arnumber=5461732.*

Brett Winterford, "Telcos Declare SMS 'Unsafe' for Bank Transaction," itnews for Australian Business, Nov. 9, 2012, 4 pages, Internet: <http://www.itnews.com.au/News/322194,telcos-declare-sms-unsafe-for-bank-transactions.aspx>.

No Author, "Dynamic Knowledge-Based Authentication," Knowledge-Based Authentication—Online Identity Verification, EVS, 2014, 2 pages, Internet: <https://www.electronicverificationsystems.com/products/knowledgebasedauthentication>.

* cited by examiner

KNOWLEDGE-BASED AUTHENTICATION BASED ON TRACKED CREDENTIAL USAGE

TECHNICAL FIELD

Embodiments of the invention relate to the field of processing data, and more particularly, to knowledge-based authentication based on tracked credential usage in a cloud-based authentication service.

BACKGROUND

Enterprises can control user access to enterprise applications, such as web applications, by authenticating users via user credentials, such as a username and password. Enterprises may wish to provide a more secure environment by implementing two-factor authentication, which uses two or more authentication factors. The authentication factors include "something the user knows" (e.g., username, password, PIN, pattern), "something the user has" (e.g., a device, a computer, a mobile phone, a physical card, a smartcard, an authentication token), and "something the user is" (e.g., a biometric characteristic such as a fingerprint or a unique retina). When a user accesses a website that uses two-factor authentication, the website might request a username and password ("something the user knows"). The website can also detect or receive identification data from a device that correlates the user with the device ("something the user has"). The website can identify the device using a device tag.

In web services, such as in client-server configurations or cloud computing configurations, an end-user signing into a relying party (RP) website, encounters situations where the end-user no longer has access to the RP website, because, for example, the end-user has lost, misplaced or forgotten credentials needed to access the RP website. In response, the RP website may choose to challenge the end-user using static knowledge-based (KB) challenges, such as "What is your Mother's Maiden name?", "What is your favorite book?", "What was your childhood nickname?" or the like. These KB challenges are based on static knowledge that is usually based the end-user's information gathered by the RP website itself. These KB challenges are also site-centric KB challenges. These static, site-centric KB challenge techniques are prone to social engineering attacks. Social engineering, in the context of security, refers to the manipulation of end-users into performing actions or divulging confidential information, such as prextexing, diversion theft, phishing, or the like. That is, the attacker can gather this static knowledge to gain access when challenged by a RP website.

SUMMARY OF THE INVENTION

A method and apparatus for knowledge-based authentication by a cloud-based authentication service are described. A cloud-based authentication service is to track credential usage of an end-user at the cloud-based authentication service. The authentication service receives a credential request for credentials associated with the end-user from a relying party website. The end-user no longer has authentication credentials for access to the relying party website. The authentication service issues a dynamic knowledge-based (KB) challenge to the end-user, the dynamic KB challenge being based on at least some of the tracked credential usage of the end-user. The processing logic receives a response to the dynamic KB challenge from the end-user and sends temporary credentials to the relying party for the end-user when the response is validated.

In one embodiment of a method, a cloud-based authentication service executing by a computing system tracks credential usage of an end-user. A credential request for credentials associated with the end-user is received from a relying party website. The end-user no longer has authentication credentials for access to the relying party website. The cloud-based authentication service issues a dynamic knowledge-based (KB) challenge to the end-user, the dynamic KB challenge being based on at least some of the tracked credential usage of the end-user. The cloud-based authentication service receives a response to the dynamic KB challenge from the end-user and sends temporary credentials to the relying party for the end-user when the response is validated.

In a further embodiment, the temporary credentials comprise temporary one-time password (OTP) credentials. In another embodiment, the temporary credentials include at least one of a token, a password, a passphrase, a passcode or the like. In a further embodiment, the cloud-based authentication service generates the dynamic KB challenge based on the credential usage. In another embodiment, the cloud-based authentication service generates the dynamic KB challenge based on credential usage history of the end-user. In one embodiment, the cloud-based authentication service generates the dynamic KB challenge to include at least one of the following: a challenge asking the end-user for a last successful login to a specified website; a challenge asking the end-user for a number of websites for which the end-user uses credentials for the cloud-based authentication service; a challenge asking the end-user for another website where the end-user uses the credentials for the cloud-based authentication service; a challenge asking the end-user for at least a partial data that the end-user first used the credentials for the cloud-based authentication service; a challenge asking the end-user where the end-user last used the credentials for the cloud-based authentication service; or a challenge asking the end-user for a type of the credentials for the cloud-based authentication service.

In another embodiment, the relying party website subscribes to a transaction verification service with the cloud-based authentication service. The cloud-based authentication service can generate the dynamic KB challenge with a challenge asking the end-user for a detail of a last transaction at the relying party website. For example, the details of the last transaction may include an amount of the transaction, a date of the transaction, a time of the transaction, content of the transaction, or a website at which the transaction took place.

In another embodiment, the cloud-based authentication service receives a Security Assertion Markup Language (SAML) authentication request for credentials associated with the end-user for the relying party website as the request for credentials. SAML is an XML-based open standard data format for exchanging authentication and authorization data between parties, in particular, between an identity provider and a service provider. The cloud-based authentication service can send the temporary credentials to the relying party when the response is validated by sending a SAML assertion with temporary OTP credentials for the temporary credentials to the relying party website when the response is validated. In another embodiment, the SAML authentication request from the relying party website to the cloud and the SAML assertion from the cloud to the relying party website are through a SAML HTTP redirect binding. The relying party website may send the temporary OTP credentials to the end-user in response to the SAML assertion. For example, the relying party website may send the temporary OTP credentials via at least one of an email message or a text message to the end-user. The cloud-based authentication service can send a SAML assertion with an access rejection to the relying party website when the response is not validated. The relying party website may send an authentication failure to the end-user in response to the SAML assertion. For example, the relying party website may send the authentication failure via a webpage of the relying party website.

In addition, a computer readable storage medium includes for issuing a dynamic KB challenge to the end-user based on tracked credential usage is described. An exemplary computer readable storage medium provides instructions, which when executed on a processing system causes the processing system to perform operations such as the exemplary methods discussed above.

Further, systems and apparatus for issuing a dynamic KB challenge to the end-user based on tracked credential usage are described. An exemplary apparatus may include a memory and a processor coupled to the memory. The processor is configured to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
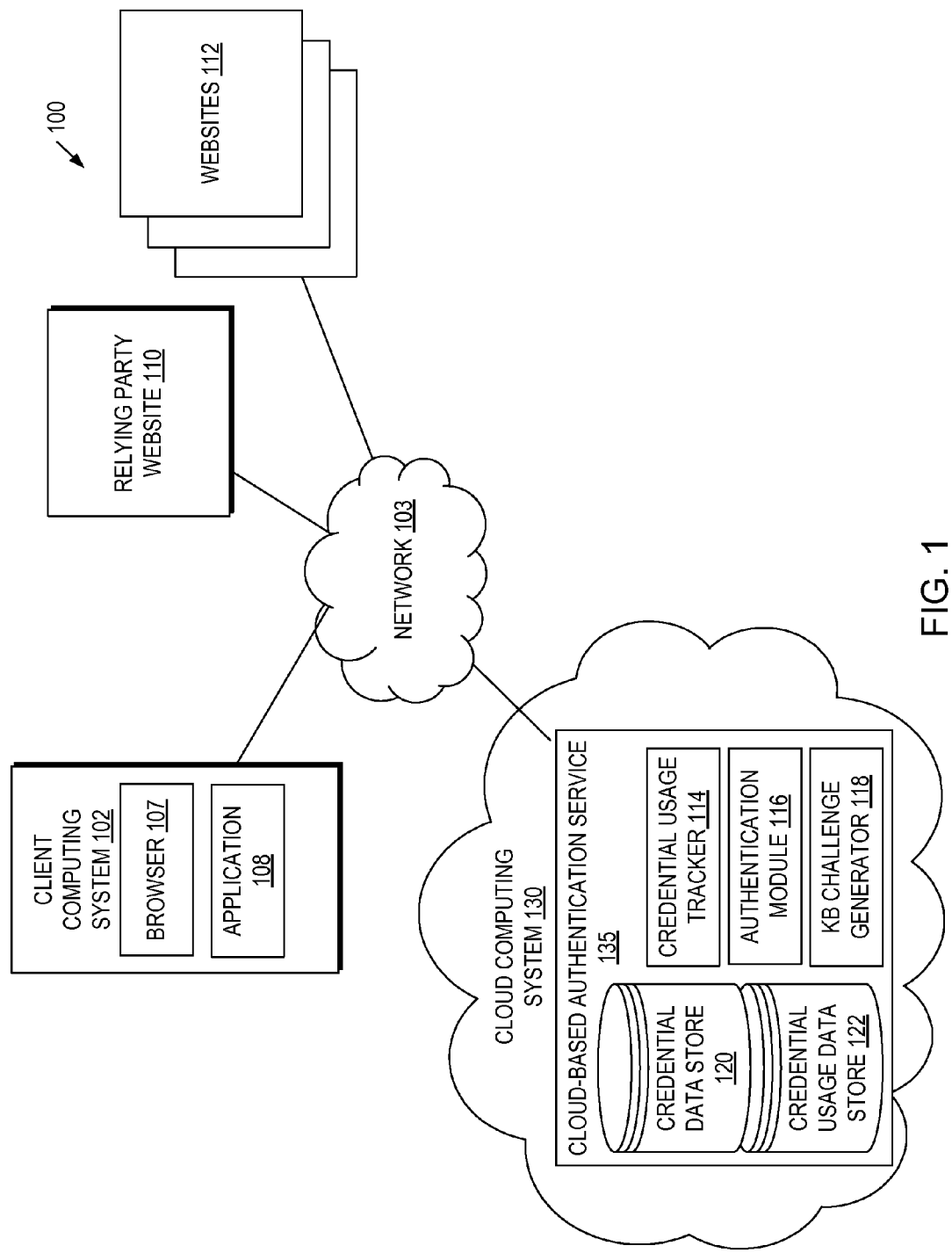
FIG. 1 is a block diagram of an exemplary network architecture in which embodiments of a cloud-based authentication service may operate.

A method and apparatus for knowledge-based authentication by a cloud-based authentication service are described. A cloud-based authentication service is to track credential usage of an end-user at the cloud-based authentication service. The authentication service receives a credential request for credentials associated with the end-user from a relying party website. The end-user no longer has authentication credentials for access to the relying party website. The authentication service issues a dynamic knowledge-based (KB) challenge to the end-user, the dynamic KB challenge being based on at least some of the tracked credential usage of the end-user. The processing logic receives a response to the dynamic KB challenge from the end-user and sends temporary credentials to the relying party for the end-user when the response is validated.

As described above, in web services, such as in client-server configurations or cloud computing configurations, an end-user signing into RP website, encounters situations where the end-user no longer has access to the RP website, because, for example, the end-user has lost, misplaced or forgotten credentials needed to access the RP website. Conventional solutions may use static KB challenge techniques where the RP website issues static KB challenges to the user with static information provided by the user. These KB challenges are site-centric to the RP website and are prone to social engineering attacks, such as by prextexing, diversion theft, phishing, or the like. That is, the attacker can gather this static knowledge to gain access when challenged by a RP website. While the site-centric KB techniques can be dynamic, these dynamic KB challenge techniques may have limitations. For example, the user intelligence tracked on a single website cannot be used or leverages while transacting on other websites. In some cases, the user intelligence being tracked can be sandboxed (separated from other running programs for security). The user intelligence gather in these scenarios is not very rich and diverse since it is limited to the single website. The user intelligence may also become stale due to long periods of inactivity of the user on the single website. These limitations may make the user intelligence gather ineffective for performing dynamic KB authentication.

The embodiments described herein can provide various advantages over other solutions. One advantage may that the credential usage data (also referred to as credential usage intelligence or credential usage history) gathered is rich and diverse as it is gathered across a multi-tenanted cloud. Another advantage may be that the intelligence gathered from one site could be leveraged while authenticating on other sites. Another advantage may be that the probability of the user intelligence going stale is lessened as the user intelligence is gathered across multi-tenanted cloud, and hence can be effectively used to perform KB authentication. Another advantage may be that the challenges are dynamic. As the KB is dynamic in nature it does not suffers from the disadvantages of static KB authentication techniques such as vulnerable to the social engineering attacks. With some or all of these advantages the embodiments described herein can make the RP website 110 more secure.

FIG. 1 is a block diagram of an exemplary network architecture in which embodiments of a cloud-based authentication service may operate. The network architecture 100 may include a cloud computing system (also referred to as a private cloud or a public cloud) 130, a client computing system (hereinafter client or end-user device or user device), a relying party website 110 and multiple websites 112, each capable of communicating with one another via a network 103. Network 103 may include, for example, a private network such as a local area network (LAN), a wide area network (WAN), a global area network (GAN) such as the Internet, or a combination of such networks, and may include a wired or wireless network. Cloud computing (the 'cloud') may refer to the access of computing resources over a computer network. Cloud computing allows for a functional separation between the computing resources used and the physical machine where the user is working. Users may access the resources in the cloud computing system 130 using client computing systems 102 (e.g., user devices), server computing systems, gateways, workstations, or the like. User devices can include managed user devices and unmanaged user devices. A managed user device refers to a user device (owned by a corporation or the user) over which the corporation can exercise some level of control. In particular, the corporation has control over what applications or programs can be installed and run on a managed user device. An unmanaged user device is a user device owned by the user that is not controlled by the corporation, such as an employee's home computer or personal cell phone. The client computing system 102 may be a personal computer, a tablet computer, a mobile phone such as a smart phone, a personal digital assistant (PDA), a portable media player, a netbook or the like.

The user can download various applications to the user device 102. In the depicted embodiment, the client computing system 102 includes browser 107 and application 108. The browser 107 (or application 108) can be used to access a relying party (RP) website 110, as well as the other websites 112. Application 108 can be any type of application, executable, program, etc. For example, the client computing system 102 may be a smartphone and the application is a mobile app that can access the relying party website 110 over the network 103. The smartphone may also include the browser 107 that can be used to access the RP website 110. Alternatively, the client computing system 102 may be a personal computer and the browser 107 may be used to access the RP website 110.

In these embodiments, the RP website 110 permits authorized users to access the RP website 110, as well as web services provided by the RP website 110. In such a configuration, the RP website 110 presents the user with a login screen where the user inputs their user credentials. The RP website 110 110 can validate the credentials or use another system or module to validate the credentials. If the user has provided valid credentials, RP website 110 110 grants access to the requesting user. In one embodiment, the RP website 110 can provide a login screen or prompt via the browser 107. In another embodiment, the RP website 110 is accessed through a downloadable client application 108 that is installed on client 102. This downloadable client application 108 may present a login screen to the user to enter the credentials and to access the RP website 110. A server associated with RP website 110 110 maintains a database of user credentials for access to the RP website 110. Alternatively, the RP website 110 may use an authentication service to authenticate user credentials for granting access.

Cloud computing, as used herein, refers to a collection of computing resources (hardware and software) that deliver services over a network, typically the Internet. There are many types of public cloud computing, and enterprises may use private cloud computing. In some cases, an end-user on the client computing system 102 access cloud-based services or cloud-based resources over the network 103. For example, end-users can access cloud-based applications through a web browser or a light-weight client application or mobile app and the software and user's data are stored on a computing system of the cloud computing system 130, such as servers at a remote location from the client computing system 102. Although the embodiments described herein are in the context of cloud computing, the embodiments may also be used in other configurations, such as client-server models, grid computing models, peer-to-peer, distributed computing models, or the like.

In the depicted embodiment, the cloud computing system 130 provides a cloud-based authentication service 135. In one embodiment, the cloud-based authentication service 135 is the Symantec Validation and ID protection (VIP) Service. The VIP service is a cloud-based strong authentication service that enables entities to secure access to networks, applications and data while preventing access by malicious unauthorized attackers. Like VIP, the cloud-based authentication service 135 may provide both two-factor authentication and risk-based, token-less authentications. The cloud-based authentication server 135 includes a credential usage tracker 114, an authentication module 116, a knowledge-based (KB) challenge generator 118, credential data store 120 and credential usage data store 122 as described in more detail below.

The RP website 110 can include an access credentials module that can receive access credentials from a user, from a device, from an application, etc. Access credentials can include data that can be used to authenticate a user, a device, and an application, etc. The access credentials module can receive access credentials, store them, provide them to requesting modules, devices or systems and facilitate access to the RP web site 110 for the end-user, such as via the browser 107 or application 108 on client 102. The access credentials may be created or defined, for example, by a user, system administrator, a device, or other person or entity. The RP website 110 can use the cloud-computing system 130 for obtaining, maintaining, storing or modifying user credentials for the RP website 110. Alternatively, the RP website 110 can obtain, maintain, store and modify the user credentials locally on the servers of the RP website 110.

The authentication module 116 may compare a combination of access credentials associated with the request to a list or database of allowable users, devices, and applications stored in the credentials data store 120, and enforce an action based on the result of the comparison. The action may include, for example, allowing the request, denying the request, modifying the request, or some other action. The action can be to confirm that the end-user has the right to access the RP website 110, including data, application(s), or service(s) at the RP website 110. Authentication module 116 can verify each of these user credentials before granting access to the end-user for the RP website 110. Authentication module 116 can provide instructions for granting, denying or limiting the application access to a resource within a network of the RP website 110.

In one embodiment, the login credentials provided by the user may vary depending on the user status. For example, the user may have a certain user name or login if the user is a member of a first group, such as being an employee of the corporation that manages a corporate network. If the user is not a member of the first group, the user may have a different set of login credentials, identifying the user as such. In addition, the login credentials may provide other information about the user, such as rank, title, position, or other information.

Authentication module 116 may be connected to user credential data store 120 and/or a policy data store, which may be file systems, databases or other data management layers resident on a data storage device such as a disk drive, RAM, ROM, database, etc. Credential usage tracker 114 may be connected to credential usage data storage 122, which may be a file system, a database or other data management layers resident on a data storage device.

Credential data store 120 may specify valid user identifiers, which may be identifiers of specific users (e.g., a user name and password) and/or user categories (e.g., an employee, a contractor, etc.). Credential data store 120 may also include a list of valid device identifiers and information on whether a corresponding device is a managed or unmanaged device. In addition, credential data store 120 may include a list of identifiers of secure applications and information on whether a corresponding application was provided by an RP website 110 of the corporation or a third party RP website. Credential data store 120 may also store public keys of secure applications provided by an application provisioning service.

KB challenge generator 118 may receive a request from the RP website 110 to generate a KB challenge, in response to the client 102 failing to access the RP website 110. In another embodiment, the RP website 110 sends the request in response to the user initiating a forgotten password process on the RP website 110. In one embodiment, the request may include information about the requestor (e.g., client 102), the RP website 110, and/or other data, such as an identity of the user making the request (e.g., user identifier), information about an application related to the request (e.g., application identifier), information about the device from which the request was made (e.g., device identifier). KB challenge generator 118 uses this information to identify the end-user for identifying appropriate credential usage by the end-user to generate the KB challenge. RP website 110 may also the authentication module 116 to subsequently authenticate the end-user for the RP website 110.

Credential usage tracker 114 gathers credential usage intelligence for the end-user in the cloud-based authentication service 135 and stores the credential usage in the credential usage data store 122. KB challenge generator 118 uses the credential usage intelligence in generating the KB challenge. In a cloud-based authentication solution (e.g., VIP service), the end-user signing into the RP website 110, may run into situations where the end-user no longer has or knows the appropriate credentials to access the RP website 110, such as lost or misplaced or forgotten credentials. Instead of the RP website 110 challenging the end-user using static (or) site-centric KB authentication techniques (e.g., 'Mother's maiden name, Favorite Car etc.'), the RP website 110 redirects the end-user with a credential request (e.g., SAML Authentication Request, for the credential associated with the end-user to the cloud-based authentication service 135. Based on the credential 'usage intelligence' gathered in networked and multi-tenanted cloud, cloud-based authentication service 135 generates a dynamic KB challenge using the KB challenge generator 118 and sends the dynamic KB challenge to the end-user. The end-user responds to this challenge. If the challenge is fulfilled, cloud-based authentication service 135 generates a response (e.g., SAML Assertion) with a temporary one time password (OTP) for the associated credential and sends back to RP website 110, which in turn sends the same to the end-user, such as to a end-user's registered SMS or E-MAIL. The credential 'usage intelligence' is constructed in the networked and multi-tenanted cloud using various mechanisms. The following are the examples for the dynamic KB challenge: 1) When was your last login to the XYZ website using access credentials for the cloud-based authentication service 135 (e.g., VIP Access credentials)? 2) With how many websites do you use your Access credentials? 3) Name another site where you use Access credential? 4) In which month did you first use your Access Credential? 5) You last used your Access Credential with? 6) What type of Access Credential do you use?

In another embodiment, the RP website 110 may have signed up for a transaction verification service with the cloud-based authentication service 135 (e.g., VIP transaction Verification service). In these embodiments, the dynamic KB challenges can be based on details of transactions with the RP website 110, such as in the following examples: 1) What is the last transaction amount at the XYZ website? 2) On what day did you make a transaction on the XYZ website?

Figure 2:
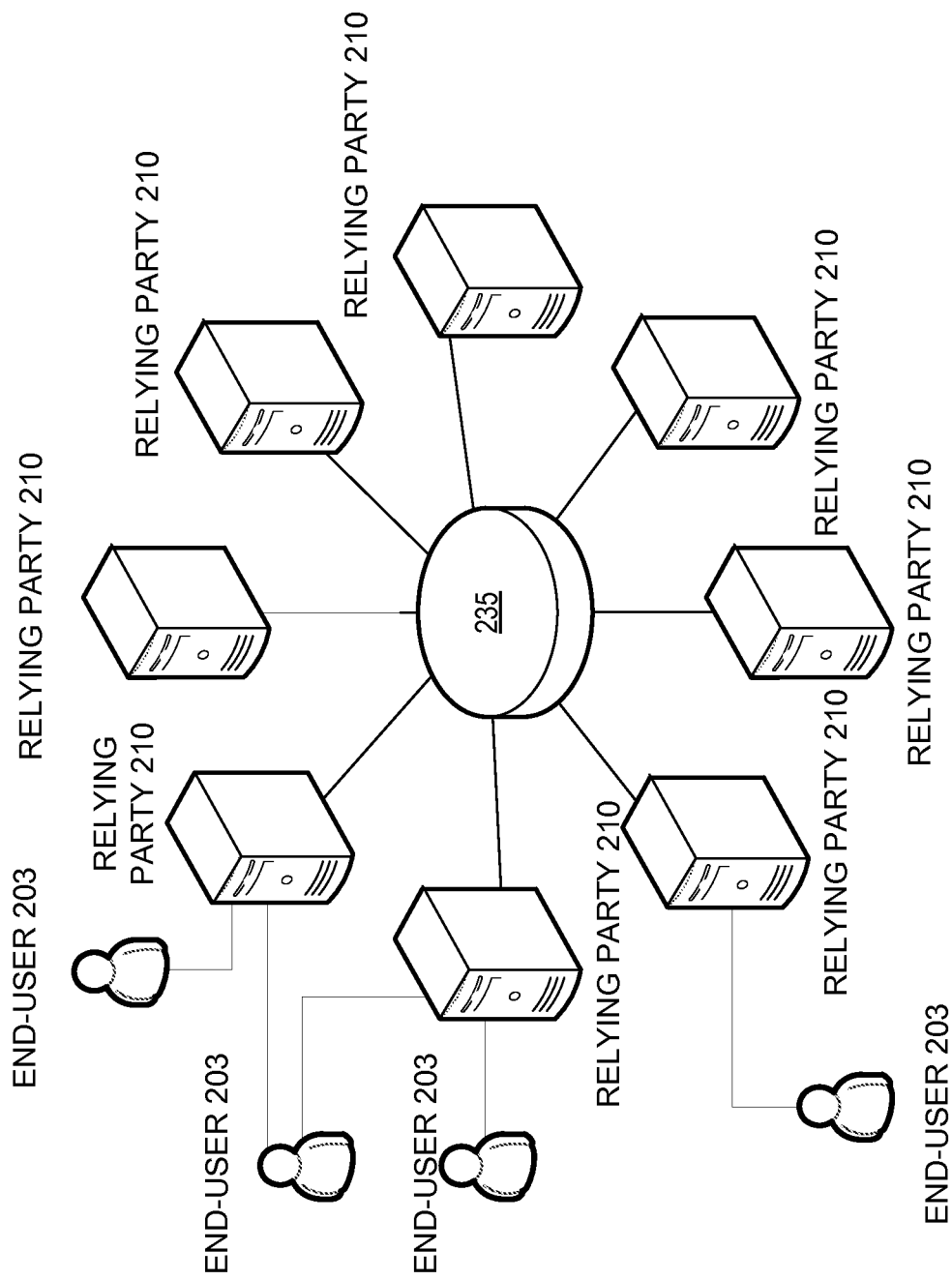
FIG. 2 is a block diagram of a cloud-based authentication service for multiple relying party websites for generating dynamic KB challenges to end-users based on credential usage.

FIG. 2 is a block diagram of a cloud-based authentication service 235 for multiple relying party websites 210 for generating dynamic KB challenges to end-users 203 based on credential usage. The cloud-based authentication service 235 may be multi-tenanted so that it may gather and track credential usage of the end-users 203 for purposes of generating dynamic KB challenges when the end-user forgets, misplaces or loses credentials for accessing any one of the RP websites 210. In one embodiment, the cloud-based authentication service 235 is the VIP service provided by Symantec Corporation of Mountain View, Calif. Alternatively, the cloud-based authentication service 235 may be other type of cloud-based authentication services that are configured to gather usage data of the end-users 203 and use the gathered usage data in generating dynamic KB challenges to the end-user 203 instead of the RP websites 210 generating static, site-centric KB challenges.

Figure 3:
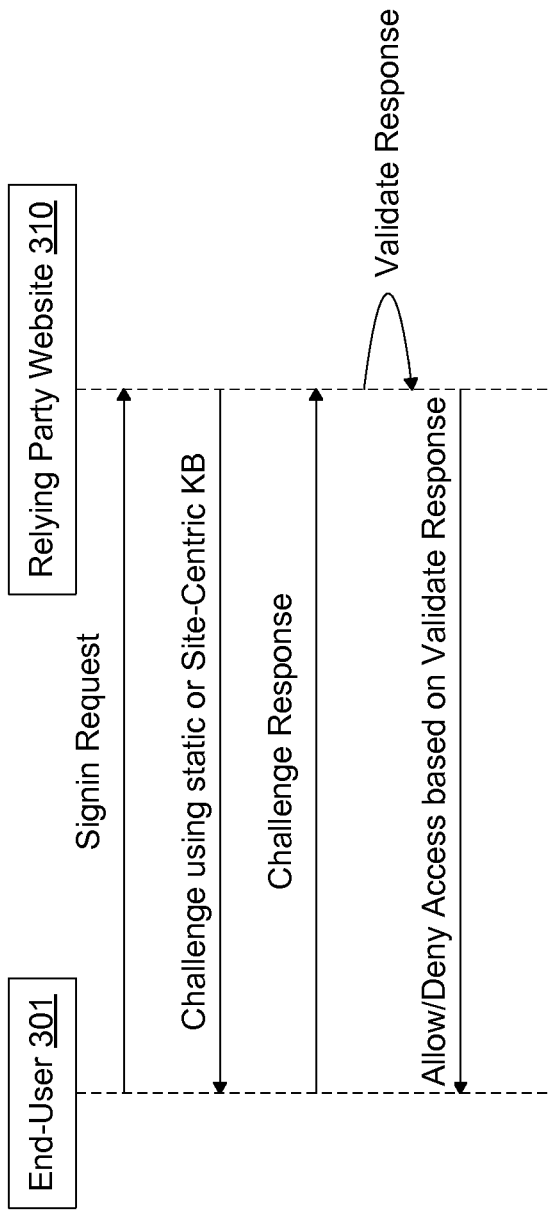
FIG. 3 is a flow sequence between an end-user and a relying party website according to conventional techniques.

FIG. 3 is a flow sequence between an end-user and a relying party website according to conventional techniques. In conventional static, site-centric KB generation techniques, an end-user 301 sends a sign-in request to a relying party (RP) website 310. The end-user 301 may indicate that he/she no longer has the user credentials for the RP website 310. The RP website 310 issues a challenge using static or site-centric KB information. The end-user 301 responds to the challenge and the RP website validates the response. When validated, the RP website 310 allows access to the end-user for the RP website 310. When not validated, the RP website 310 denies access to the end-user for the RP website 310.

Figure 4:
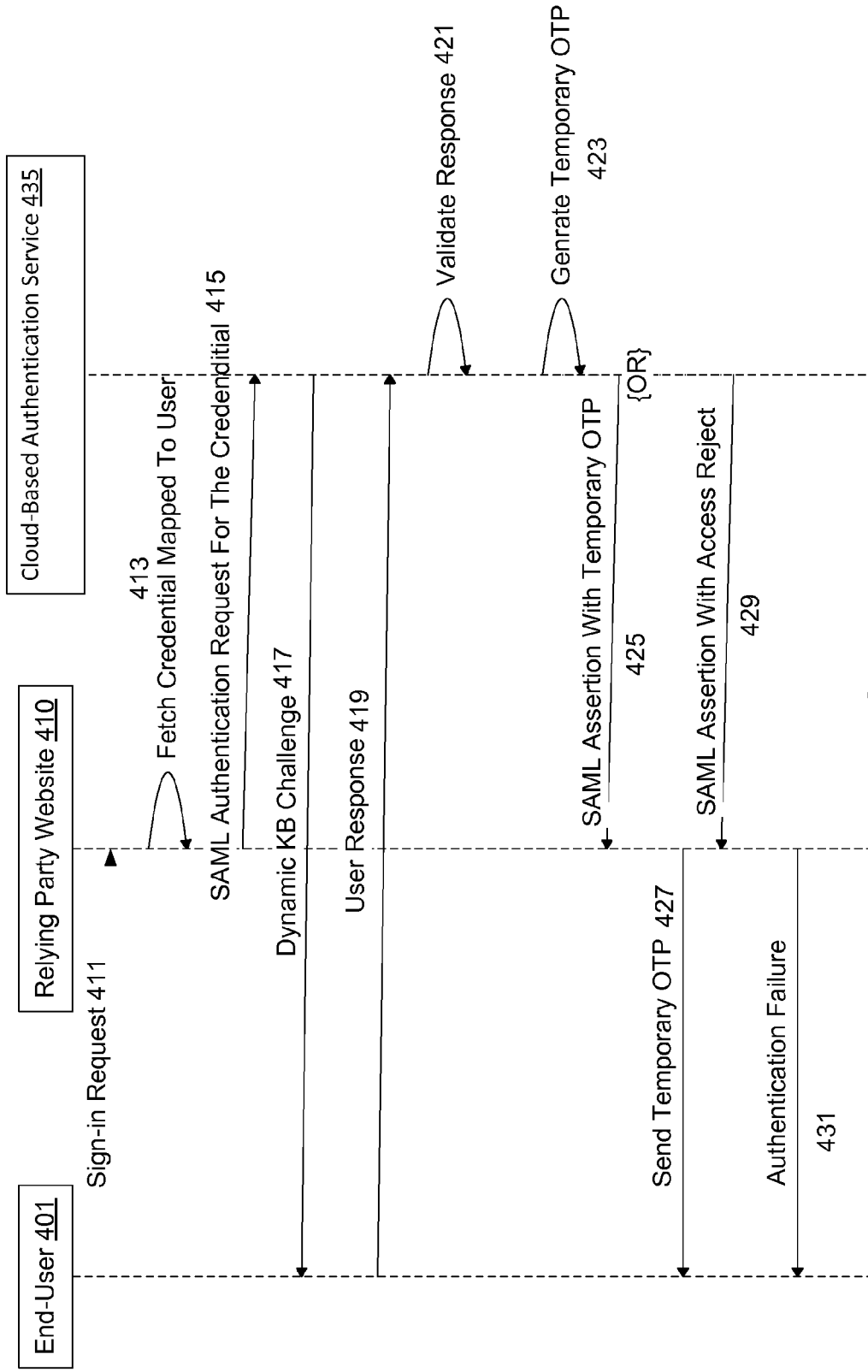
FIG. 4 is a flow sequence between an end-user, a relying party website and a cloud-based authentication service according to one embodiment.

FIG. 4 is a flow sequence between an end-user 401, a relying party website 410 and a cloud-based authentication service 435 according to one embodiment. The end-user 401 signing into RP website 410 may encounter situations where the end-user 401 no longer has access to the RP website 410, because, for example, the end-user 401 has lost, misplaced or forgotten credentials needed to access the RP website 410. An end-user 401 who has lost or misplaced his strong authentication credentials tries to login to a relying party website 410 with a sign-in request 411. The relying party website 410 fetches credentials 413 mapped to the end-user 401. The relying party website 410 redirects the end-user 401 with a SAML Authentication Request 415 for the credential associated with the end-user 401 to the cloud-based authentication service 435. Based on the credential 'usage intelligence' gathered in networked and multi-tenanted cloud, the cloud-based authentication service 435 generates a dynamic KB challenge and sends the dynamic KB challenge 417 to the end-user 401. The end-user 401 responds to this challenge 419. The cloud-based authentication service 435 validates the response 421. If the challenge is fulfilled, the cloud-based authentication service 435 generates a temporary one-time password (OTP) 423 and generates an SAML Assertion 425 with the OTP for the associated credential to the relying party website 410. The relying party website 410 sends the same 427 to the end-user 401, for example, via the end-user's registered SMS or E-MAIL. If the challenge is not verified, the cloud-based authentication service 435 sends a SAML assertion with an access rejection 429 to the relying party website 410. The relying party website 410 sends an authentication failure 431 to the end-user 401 in response to the SAML assertion 429. SAML defines XML-based assertions and protocols, bindings, and profiles. A SAML assertion contains a packet of security information. SAML assertions are usually transferred from identity providers to service providers and may contain statements that service providers use to make access-control decisions, such as authentication statements, attribute statements, authorization decision statements, or the like. A SAML protocol describes how certain SAML elements (including assertions) are packaged with SAML request and response elements, and gives the processing rules that SAML entities follow when producing or consuming these elements. A SAML binding is a mapping of a SAML protocol message onto standard messaging formats and/or communication protocols. For example, the SAML SOAP binding specifies how a SAML message is encapsulated in a SOAP envelope, which itself is bound to an HTTP message. In one embodiment, the SAML authentication request from the relying party website 410 to the cloud-based authentication service 435 and the SAML response from the cloud-based authentication service 435 to the relying party website 410 are through a SAML HTTP redirect binding. A SAML profile describes in detail how SAML assertions, protocols, and bindings combine to support a defined use case.

Figure 5:
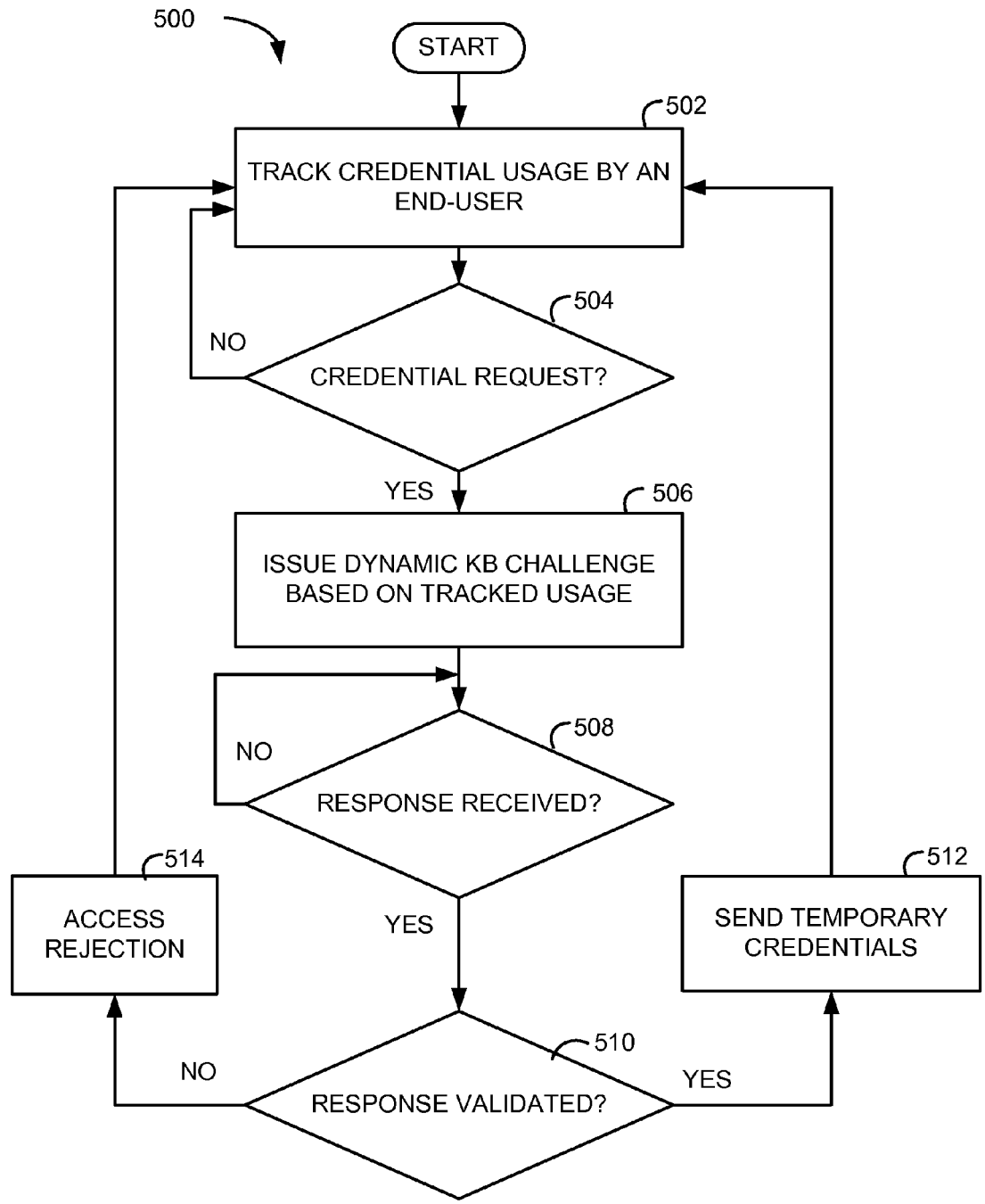
FIG. 5 is a flow diagram of one embodiment of a method of issuing a dynamic a knowledge-based (KB) challenge to the end-user based on tracked credential usage.

FIG. 5 is a flow diagram of one embodiment of a method 500 of issuing a dynamic a knowledge-based (KB) challenge to the end-user based on tracked credential usage. The method 500 is performed by processing logic that may comprise hardware (circuitry, dedicated logic, etc.), software (such as is run on a general-purpose computing system or a dedicated machine), or a combination of both. In one embodiment, the cloud-based authentication service 135 of FIG. 1 performs the method 500. In another embodiment, the credential usage tracker 114, authentication module 116 and KB challenge generator 118 of FIG. 1 performs the method 500. In another embodiment, the cloud-based authentication service 235 of FIG. 2 performs the method 500. Alternatively, other components of the client computing system 102, relying party website 110, or cloud computing system 130 can be configured to perform some or all of the method 500.

Referring to FIG. 5, method 500 begins by the processing logic tracking credential usage of an end-user by a cloud-based authentication service (block 502). The processing logic checks to see if a credential request for credentials associated with the end-user is received from a relying party website (block 504). The end-user no longer has authentication credentials for access to the relying party website. If at block 504 no credential request is received, the processing logic continues tracking the credential usage at block 502. When the credential request is received at block 504, the processing logic issues a dynamic knowledge-based (KB) challenge to the end-user (block 506). The dynamic KB challenge is based on at least some of the tracked credential usage of the end-user. The processing logic waits at block 508 to receive a response to the dynamic KB challenge from the end-user. The processing logic validates the response (block 510). When the response is validated at block 510, the processing logic sends temporary credentials to the relying party for the end-user (block 512), and returns to block 502. In one embodiment, the temporary credentials comprise temporary one-time password (OTP) credentials. When the response is not validated at block 510, the processing logic sends an access rejection to the relying party website when the response is not validated (block 514) and returns to block 504. The relying party website sends an authentication failure to the end-user in response to the access rejection.

In one embodiment, the processing logic generates, the dynamic KB challenge based on the credential usage as part of issuing at block 506. In another embodiment, the cloud-based authentication service generates the dynamic KB challenge based on credential usage history of the end-user. Alternatively, the dynamic KB challenge may be generated by another service than the cloud-based authentication service. In one embodiment, the processing logic generates the dynamic KB challenge by generating the dynamic KB challenge to include at least one of the following: 1) a challenge asking the end-user for a last successful login to a specified website; 2) a challenge asking the end-user for a number of web sites for which the end-user uses credentials for the cloud-based authentication service; 3) a challenge asking the end-user for another website where the end-user uses the credentials for the cloud-based authentication service; 4) a challenge asking the end-user for at least a partial data that the end-user first used the credentials for the cloud-based authentication service; 5) a challenge asking the end-user where the end-user last used the credentials for the cloud-based authentication service; or 6) a challenge asking the end-user for a type of the credentials for the cloud-based authentication service.

In another embodiment, the relying party website subscribes to a transaction verification service with the cloud-based authentication service. The processing logic generates the dynamic KB challenge by generating the dynamic KB challenge with a challenge asking the end-user for a detail of a last transaction at the relying party website. The details may include a transaction amount, a transaction date, a transaction time, a frequency of transactions, a website of the transaction or the like.

In another embodiment, the processing logic receives the credential request from the relying party website as a Security Assertion Markup Language (SAML) authentication request for credentials associated with the end-user for the relying party website. In a further embodiment, the processing logic sends the temporary credentials by sending a SAML assertion with temporary one-time password (OTP) credentials for the temporary credentials to the relying party website when the response is validated. The relying party website sends the temporary OTP credentials to the end-user in response to the SAML assertion. In a further embodiment, the processing logic sends a second SAML assertion with an access rejection to the relying party website when the response is not validated. The relying party website sends an authentication failure to the end-user in response to the second SAML assertion. In another embodiment, the SAML authentication request from the relying party website to the cloud and the SAML assertion from the cloud to the relying party website are through a SAML HTTP redirect binding. In one embodiment, the processing logic sends the temporary OTP credentials via a delivery mechanism, such as an email message or a text message to the end-user. Alternatively, other delivery mechanisms may be used to deliver the temporary credentials. In another embodiment, the relying party website sends the authentication failure via a webpage of the relying party website. Alternatively, other mechanisms may be used to notify the end-user of the authentication failure.

Figure 6:
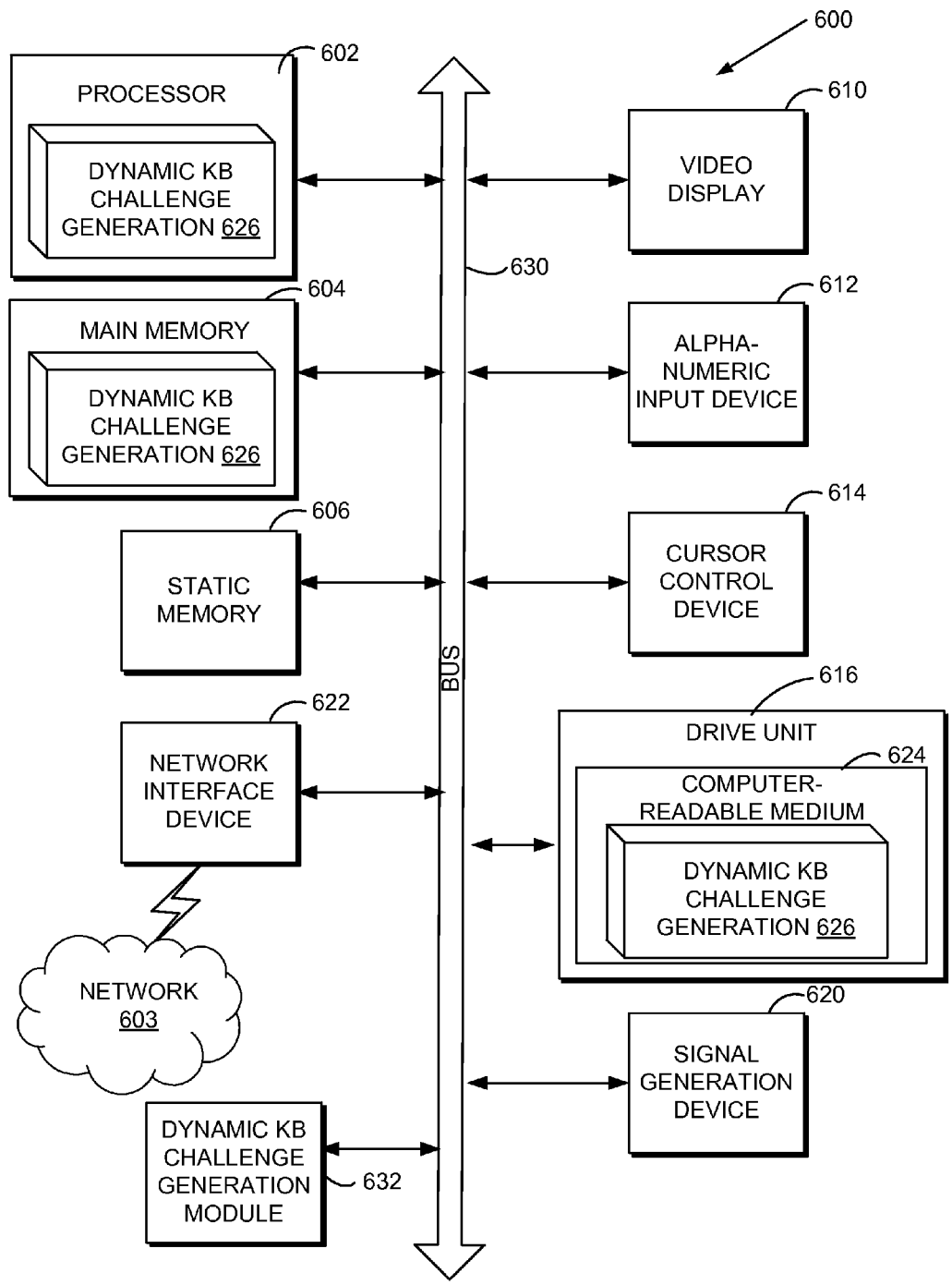
FIG. 6 illustrates a diagrammatic representation of a machine in the exemplary form of a computing system within which a set of instructions, for causing the machine to perform any one or more of the methodologies described herein, may be executed.

FIG. 6 illustrates a diagrammatic representation of a machine in the exemplary form of a computing system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as method 300 of FIG. 3.

The exemplary computing system 600 includes a processor 602, a main memory 604 (e.g., read-only memory (ROM), flash memory, dynamic random access memory (DRAM)

such as synchronous DRAM (SDRAM), etc.), a static memory 606 (e.g., flash memory, static random access memory (SRAM), etc.), and a data storage device 618, which communicate with each other via a bus 606.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic for DLP scanning with language detection 626 for performing the operations and steps discussed herein.

The computing system 600 may further include a network interface device 622. The computing system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions (e.g., dynamic KB challenge generation 626) embodying any one or more of the methodologies or functions described herein. The dynamic KB challenge generation 626 may also reside, completely or at least partially, within the main memory 604 and/or within the processor 602 during execution thereof by the computing system 600, the main memory 604 and the processor 602 also constituting computer-readable media. The dynamic KB challenge generation 626 may further be transmitted or received over a network 603 via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The dynamic KB challenge generation module 632, components, and other features described herein (for example in relation to FIGS. 1, 2, 3) can be implemented as discrete hardware components or integrated in the functionality of hardware components such as ASICS, FPGAs, DSPs, or similar devices. The dynamic KB challenge generation module 632 may implement operations of dynamic KB challenge generation as described herein with respect to FIG. 5. In addition, the dynamic KB challenge generation module 632 can be implemented as firmware or functional circuitry within hardware devices. Further, the dynamic KB challenge generation module 632 can be implemented in any combination hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "identifying," "storing," "providing," "selecting," "obtaining," "receiving," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    tracking credential usage of an end-user on one or more end-user devices by a cloud-based authentication service executing by a server computing system;
    receiving, at the cloud-based authentication service over a first connection between the server computing system and a relying party website, a credential request for credentials associated with the end-user for the relying party website, wherein the end-user no long has authentication credentials for access to the relying party website;
    issuing, by the cloud-based authentication service over a second connection between the server computing system and a first end-user device of the one or more end-user devices, a dynamic knowledge-based (KB) challenge to the end-user on the first end-user device, wherein the dynamic KB challenge is based on the tracked credential usage of the end user, wherein at least a portion of the dynamic KB challenge comprises information from the credential usage that is not site-centric to the relying party website;
    receiving, at the cloud-based authentication service over the second connection, a response to the dynamic KB challenge from the end-user; and
    sending temporary credentials over the first connection to the relying party website for the end-user when the response is validated.

2. The method of claim 1, wherein the temporary credentials comprise temporary one-time password (OTP) credentials.

3. The method of claim 1, further comprising generating, by the cloud-based authentication service, the dynamic KB challenge based on the credential usage.

4. The method of claim 3, wherein the credential usage comprises credential usage history of the end-user, wherein the generating the dynamic KB challenge comprises generating the dynamic KB challenge based on the credential usage history, and wherein the dynamic KB challenge comprises at least one of the following:
    a challenge asking the end-user for a last successful login to a specified website;
    a challenge asking the end-user for a number of websites for which the end-user uses credentials for the cloud-based authentication service;
    a challenge asking the end-user for another website where the end-user uses the credentials for the cloud-based authentication service;
    a challenge asking the end-user for at least one of the credentials that the end-user first used for the cloud-based authentication service;
    a challenge asking the end-user where the end-user last used the credentials for the cloud-based authentication service; or
    a challenge asking the end-user for a type of the credentials for the cloud-based authentication service.

5. The method of claim 3, wherein the relying party website subscribes to a transaction verification service with the cloud-based authentication service, and wherein the generating the dynamic KB challenge comprises generating the dynamic KB challenge with a challenge asking the end-user for a detail of a last transaction at the relying party website.

6. The method of claim 1, wherein the receiving the credential request from the relying party website comprises receiving a Security Assertion Markup Language (SAML) authentication request for credentials associated with the end-user for the relying party website.

7. The method of claim 1, wherein the sending the temporary credentials to the relying party website when the response is validated comprises sending a Security Assertion Markup Language (SAML) assertion with temporary one-time password (OTP) credentials for the temporary credentials to the relying party website when the response is validated, wherein the relying party website sends the temporary OTP credentials to the end-user in response to the SAML assertion.

8. The method of claim 1, further comprising sending a Security Assertion Markup Language (SAML) assertion with an access rejection to the relying party website when the response is not validated, wherein the relying party website sends an authentication failure to the end-user in response to the SAML assertion.

9. The method of claim 6, wherein the SAML authentication request from the relying party website to the cloud-based authentication service and a SAML assertion from the cloud-based authentication service to the relying party website are through a SAML HTTP redirect binding.

10. The method of claim 7, wherein the relying party website sends the temporary OTP credentials via at least one of an email message or a text message, and wherein the relying party website sends an authentication failure via a webpage of the relying party website.

11. A computing system comprising:
a memory; and
a processor coupled with the memory to execute a cloud-based authentication service to:
track credential usage of an end-user on one or more end-user devices by a cloud-based authentication service executing by a server computing system;
receive, at the cloud-based authentication service over a first connection between the server computing system and a relying party website, a credential request for credentials associated with the end-user for the relying party website, wherein the end-user no long has authentication credentials for access to the relying party website;
issue, by the cloud-based authentication service over a second connection between the server computing system and a first end-user device of the one or more end-user devices, a dynamic knowledge-based (KB) challenge to the end-user on the first end-user device, wherein the dynamic KB challenge is based on the tracked credential usage of the end user, wherein at least a portion of the dynamic KB challenge comprises information from the credential usage that is not site-centric to the relying party website;
receive, at the cloud-based authentication service over the second connection, a response to the dynamic KB challenge from the end-user; and
send temporary credentials over the first connection to the relying party website for the end-user when the response is validated.

12. The computing system of claim 11, wherein the temporary credentials comprise temporary one-time password (OTP) credentials.

13. The computing system of claim 11, wherein the credential usage comprises credential usage history of the end-user, wherein the processor is further to generate, by the cloud-based authentication service, the dynamic KB challenge based on the credential usage history, and wherein the dynamic KB challenge comprises at least one of the following:
a challenge asking the end-user for a last successful login to a specified website;
a challenge asking the end-user for a number of websites for which the end-user uses credentials for the cloud-based authentication service;
a challenge asking the end-user for another website where the end-user uses the credentials for the cloud-based authentication service;
a challenge asking the end-user for at least one of the credentials that the end-user first used for the cloud-based authentication service;
a challenge asking the end-user where the end-user last used the credentials for the cloud-based authentication service; or
a challenge asking the end-user for a type of the credentials for the cloud-based authentication service.

14. The computing system of claim 11, wherein the relying party website subscribes to a transaction verification service with the cloud-based authentication service, and wherein the processor is further to generate the dynamic KB challenge with a challenge asking the end-user for a detail of a last transaction at the relying party website.

15. The computing system of claim 11, wherein the processor is further to:
receive a Security Assertion Markup Language (SAML) authentication request for credentials associated with the end-user for the relying party website;
send a first SAML assertion with temporary one-time password (OTP) credentials for the temporary credentials to the relying party website when the response is validated, wherein the relying party website is to send the temporary OTP credentials to the end-user in response to the first SAML assertion; and
send a second SAML assertion with an access rejection to the relying party website when the response is not validated, wherein the relying party website is to send an authentication failure to the end-user in response to the second SAML assertion.

16. A non-transitory computer readable storage medium including instructions that, when executed by a processor, cause the processor to perform operations comprising:
tracking credential usage of an end-user on one or more end-user devices by a cloud-based authentication service executing by a server computing system;
receiving, at the cloud-based authentication service over a first connection between the server computing system and a relying party website, a credential request for credentials associated with the end-user for the relying party website, wherein the end-user no long has authentication credentials for access to the relying party website;
issuing, by the cloud-based authentication service over a second connection between the server computing system and a first end-user device of the one or more end-user devices, a dynamic knowledge-based (KB) challenge to the end-user on the first end-user device, wherein the dynamic KB challenge is based on the tracked credential usage of the end user, wherein at least a portion of the dynamic KB challenge comprises information from the credential usage that is not site-centric to the relying party website;
receiving, at the cloud-based authentication service over the second connection, a response to the dynamic KB challenge from the end-user; and
sending temporary credentials over the first connection to the relying party website for the end-user when the response is validated.

17. The non-transitory computer readable storage medium of claim 16, wherein the temporary credentials comprise temporary one-time password (OTP) credentials.

18. The non-transitory computer readable storage medium of claim 16, wherein the credential usage comprises credential usage history of the end-user, wherein the operations further comprises generating, by the cloud-based authentication service, the dynamic KB challenge based on the credential usage history, and wherein the dynamic KB challenge comprises at least one of the following:

a challenge asking the end-user for a last successful login to a specified website;

a challenge asking the end-user for a number of websites for which the end-user uses credentials for the cloud-based authentication service;

a challenge asking the end-user for another website where the end-user uses the credentials for the cloud-based authentication service;

a challenge asking the end-user for at least one of the credentials that the end-user first used for the cloud-based authentication service;

a challenge asking the end-user where the end-user last used the credentials for the cloud-based authentication service; or a challenge asking the end-user for a type of the credentials for the cloud-based authentication service.

19. The non-transitory computer readable storage medium of claim 16, wherein the relying party website subscribes to a transaction verification service with the cloud-based authentication service, and wherein the operations further comprise generating the dynamic KB challenge with a challenge asking the end-user for a detail of a last transaction at the relying party website.

20. The non-transitory computer readable storage medium of claim 16, wherein the receiving the credential request from the relying party website comprises receiving a Security Assertion Markup Language (SAML) authentication request for credentials associated with the end-user for the relying party website, wherein the sending the temporary credentials to the relying party website when the response is validated comprises sending a first SAML assertion with temporary one-time password (OTP) credentials for the temporary credentials to the relying party website when the response is validated, wherein the relying party website sends the temporary OTP credentials to the end-user in response to the first SAML assertion, and wherein the operations further comprise sending a second SAML assertion with an access rejection to the relying party website when the response is not validated, wherein the relying party website sends an authentication failure to the end-user in response to the second SAML assertion.

* * * * *